US012020891B2

(12) United States Patent
Urakata

(10) Patent No.: US 12,020,891 B2
(45) Date of Patent: Jun. 25, 2024

(54) KLYSTRON

(71) Applicant: CANON ELECTRON TUBES & DEVICES CO., LTD., Otawara (JP)

(72) Inventor: Hiroto Urakata, Otawara (JP)

(73) Assignee: CANON ELECTRON TUBES & DEVICES CO., LTD., Otawara (JP)

(*) Notice: Subject to any disclaimer, the term of this patent is extended or adjusted under 35 U.S.C. 154(b) by 264 days.

(21) Appl. No.: 17/658,496

(22) Filed: Apr. 8, 2022

(65) Prior Publication Data

US 2023/0055124 A1 Feb. 23, 2023

(30) Foreign Application Priority Data

Aug. 18, 2021 (JP) ................................ 2021-133372

(51) Int. Cl.
*H01J 25/10* (2006.01)

(52) U.S. Cl.
CPC .................................. *H01J 25/10* (2013.01)

(58) Field of Classification Search
CPC .................................. H01J 25/10; H03B 9/04
See application file for complete search history.

(56) References Cited

U.S. PATENT DOCUMENTS

2019/0057831 A1* 2/2019 Duan ...................... H01J 23/20
2020/0118782 A1* 4/2020 Anno ...................... H01J 25/10

FOREIGN PATENT DOCUMENTS

JP 2020-113498 A 7/2020

* cited by examiner

*Primary Examiner* — Alexander H Taningco
*Assistant Examiner* — Pedro C Fernandez
(74) *Attorney, Agent, or Firm* — Oblon, McClelland, Maier & Neustadt, L.L.P.

(57) ABSTRACT

According to one embodiment, a klystron includes a plurality of cavity resonators arranged next to each other on a coaxial line. The cavity resonators each comprise a cylindrical body, one and another drift tubes provided on respective sides of respective ends of the cylindrical body, one and another support and a space adjustment means which adjusts the space between the one and the other drift tubes. The cylindrical body comprises a projection projecting from one end surface parallel to the axial line, and the one support is provided to abut on the projection, and the space adjustment means presses the one support toward the projection and adjusts the space between the one and the other drift tubes by plastically deforming the projection.

5 Claims, 3 Drawing Sheets

KLYSTRON

CROSS-REFERENCE TO RELATED APPLICATIONS

This application is based upon and claims the benefit of priority from Japanese Patent Application No. 2021-133372, filed Aug. 18, 2021, the entire contents of which are incorporated herein by reference.

FIELD

Embodiments described herein relate generally to a klystron.

BACKGROUND

The klystron comprises multiple cavity resonators arranged on a coaxial line, and when an electron beam output from the electron gun are allowed to pass through the cavity resonators, the interaction between the electron beam and the cavity resonators converts the DC power to high-frequency power, resulting in stable microwave amplification. The cavity resonators are tuned to a resonance frequency suitable for the interaction with the electron beams.

On the other hand, some cavity resonators comprise a cylindrical body, drift tubes at respective ends of the cylindrical body and discs (supports) each supporting the drift tubes at each end of the cylindrical body.

In such a cavity resonator, the drift tubes are disposed to face each other at a predetermined interval therebetween. Here, in order to adjust the interval between the drift tubes, the disc (support) is provided with a thin part to surround the drift tubes, and thus the position of the drift tubes can be adjusted by plastically deforming the thin part surrounding the drift tubes.

In the cavity resonators, the electron beams passing through are subjected to velocity modulation to be density modulated by the cavity resonator. Thus, as the electron beams with crude density pass through the drift tube, the induced current flows on the inner surface wall of the drift tube.

As described above, when the klystron is operated, the loss occurs on the inner wall of the drift tube due to the induced current, which is converted into heat and diffused to the surroundings.

However, when a thin wall is provided for the support, the heat diffusion from the inner wall of the drift tube is blocked by the thin wall, and the heat conduction to the surrounding direction of the disk cannot occur sufficiently, which may increase the temperature of the drift tube to high. When the temperature of the drift tube changes significantly, the dimensions change due to thermal expansion, and the resonance frequency changes. As a result, the interaction between the cavity resonator and the electron beam is affected, and the operation of the klystron becomes unstable, which is not desired.

An object of the embodiments is to provide a klystron that can operate stably.

DETAILED DESCRIPTION

Figure 1:
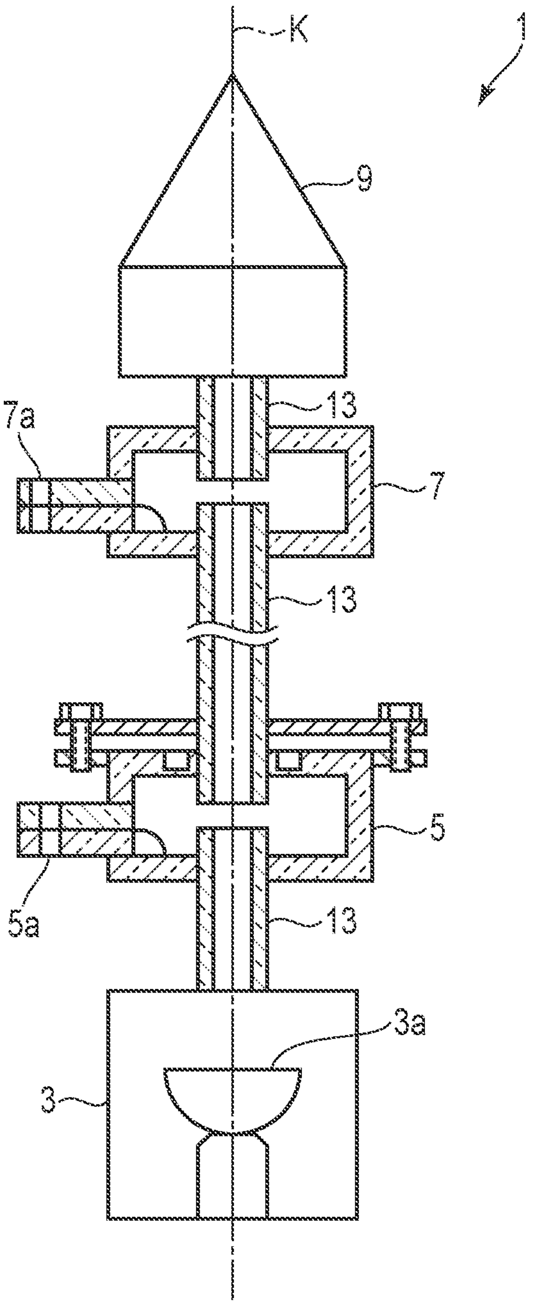
FIG. 1 is a cross-sectional view showing a schematic structure of a klystron according to an embodiment.

In general, according to one embodiment, a klystron comprises a plurality of cavity resonators arranged next to each other on a coaxial line. The cavity resonators each comprising a cylindrical body, one and another drift tubes provided on respective sides of respective ends of the cylindrical body, one and another support supporting the drift tubes respectively at the respective ends of the cylindrical body, and a space adjustment means which adjusts the space between the one and the other drift tubes. The cylindrical body comprises a projection projecting from one end surface parallel to the axial line, and the one support being provided to abut on the projection, and the space adjustment means presses the one support toward the projection and adjusts the space between the one and the other drift tubes by plastically deforming the projection.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First, an embodiment will be described with reference to FIGS. 1 to 3.

As shown in FIG. 1, a klystron 1 of the embodiment comprises an electron gun 3, an input cavity 5, an output cavity 7, and a collector 9 on a coaxial line with respect to an axial like K, and between the input cavity 5 and the output cavity 7, a plurality of cavity resonators 11 (see FIG. 2) are installed next to each other on the axial line K.

The electron gun 3 comprises a cathode 3*a*.

The input cavity 5 comprises an input window 5*a* for high radio frequency (RF) power, and the output cavity 7 comprises an output window 7*a* for the radio frequency (RF) power.

The cavities 5, 7 and 11 are arranged so that drift tubes 13 thereof are aligned with the axial line K.

An electron beam output from the electron gun 3 is allowed to pass through the input cavity 5 and the cavity resonators 11 (to be described later), where an interaction between the electron beam and the cavity resonators 11 occurs to convert DC power to RF power, and then the amplified RF power is extracted from the output window 7*a* of the output cavity 7.

Figure 2:
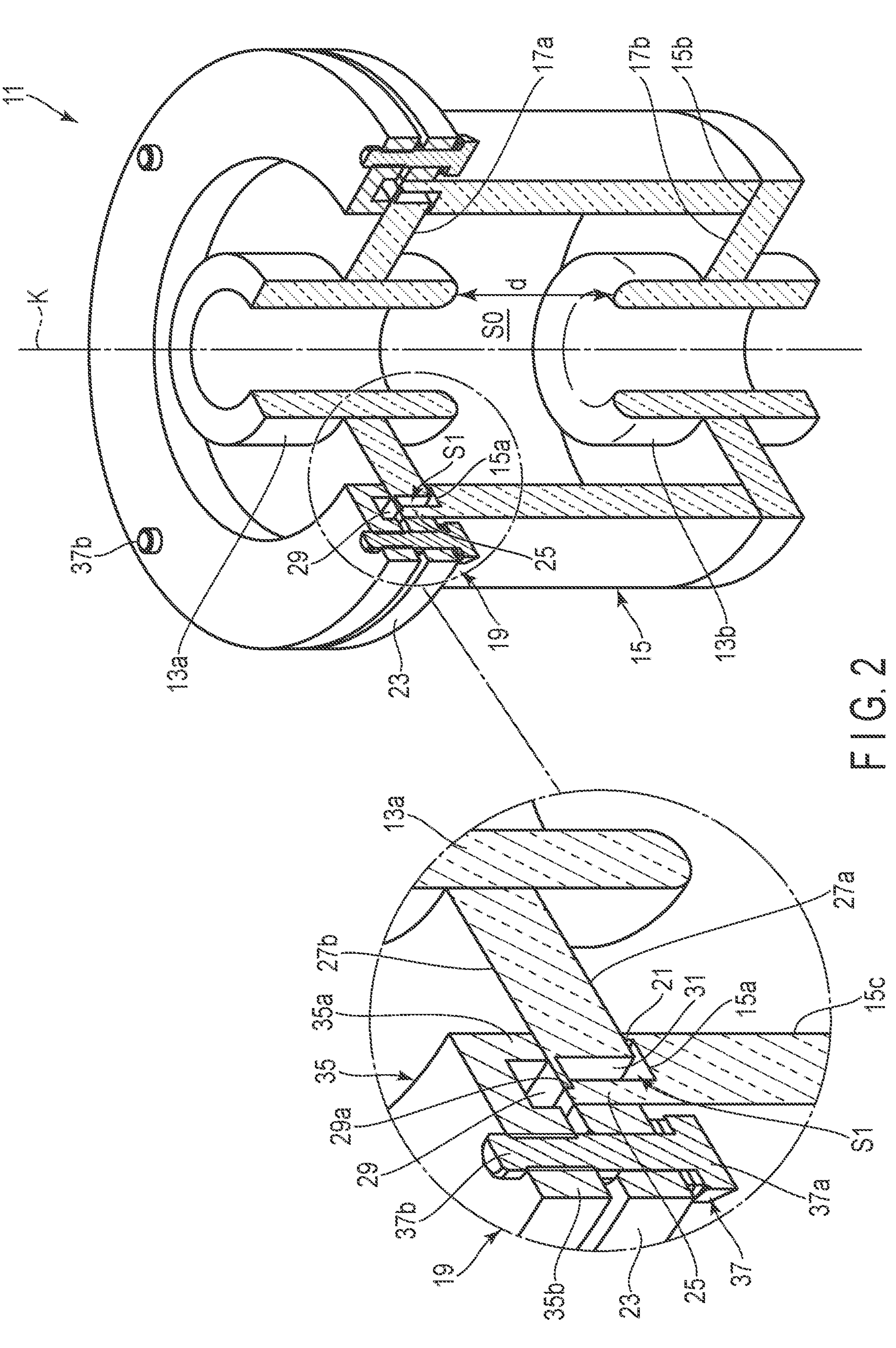
FIG. 2 is a partially decomposed perspective diagram showing a cavity resonator used in the klystron of the embodiment.

As shown in FIG. 2, the cavity resonators 11 each comprise a cylindrical body 15, a drift tube 13*a* provided on one end side of the cylindrical body 15, another drift tube 13*b* provided on the other end side of the cylindrical body 13, a support 17*a* which supports the drift tube 13*a*, another support 17*a* which supports the other drift tube 13*b* and a space adjustment means 19.

The cylindrical body 15 comprises a projection 21 projecting outward from one end surface 15*a* parallel to the axial line K. The projection 21 continuously projects on an inner circumferential surface 15*c* side of the cylindrical body 15 and is continuous throughout the entire circumference of the cylindrical body 15.

Figure 3:
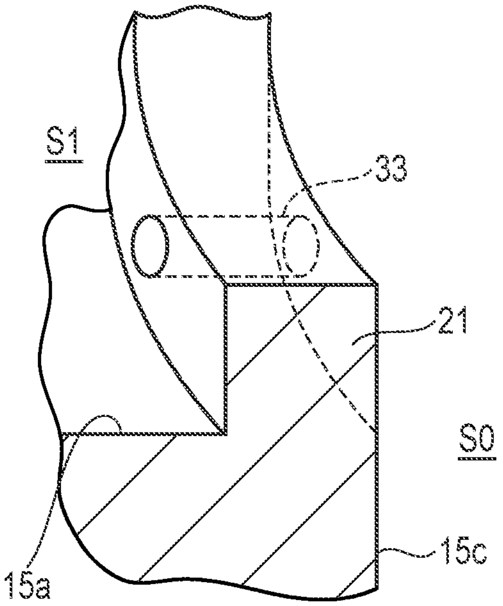
FIG. 3 is a partially decomposed perspective diagram showing a projection portion shown in FIG. 2.

As shown in FIG. 3, the projection 21 has a substantially rectangular shape in its longitudinal section.

As shown in FIG. 2, the outer circumference on the one end surface 15*a* side of the cylindrical body 15 comprises a flange 23 provided all along the circumferential direction.

The drift tube 13*a* and the other drift tube 13*b* are each cylindrical in shape and comprise respective end portions facing each other, and they are arranged to be spaced apart from each other with a gap d between the drift tubes. By adjusting the drift tube gap d, the resonance frequency is adjusted.

The support 17*a*, which supports the drift tube 13*a*, and the other support 17*b*, which supports the other drift tube 13*b* are each formed into a disk shape with a hole in the center, and the disks are formed to have a uniform thickness.

Into the holes in the center of the support 17*a* and the other support 17*b*, the drift tube 13*a* and the other drift tube 13*b* are respectively made to penetrate and fixed thereon.

The support 17*a* is provided on an end surface 15*a* side of the cylindrical body 15, and the outer circumferential portion thereof is disposed to abut to the projection 21.

The other support 17*b* is provided on the other end surface 15*b* side of the cylindrical body 15, and the outer circumferential portion thereof is tightly attached to the other end surface 15*b* and fixed by brazing or the like.

Here, the end surface 15*a* of the cylindrical body 15 and the outer circumferential portion of the support 17*a* will now be described in more detail.

A step portion 25 is form to rise continuously on the outer circumferential portion of the end surface 15*a* of the cylindrical body, as a step to the end surface 15*a*.

On the outer circumferential portion of the support 17*a*, an abutting piece 29 is formed on a surface 27*b* on an opposite side to an abutting surface 27*a* to the projection 21, which continuously protrudes therefrom in the outer circumferential direction so as to abut on the step portion 25. The abutting piece 29 is formed over the entire circumferential direction of the support 17*a*.

An outer circumferential edge 29*a* of the abutting piece 29 is engaged and fixed to the inner circumferential surface of the step portion 25 by brazing or the like.

Them, between the outer circumferential surface 31 of the support 17*a* and the end surface 15*a* of the cylindrical body 15, an airtight space S1 surrounded by the projection 21, the step portion 25 and the above-mentioned abutting piece 29 is formed.

As shown in FIG. 3, the projection 21 comprises communicating holes which communicate to the airtight space S1 and an inner space S0 of the cylindrical body 15, arranged in the circumferential direction thereof at predetermined intervals therebetween.

The space adjustment means 19 presses the supports 17*a* toward the projection 21 to plastically deform the projection 21, and thus the drift tube gap d is adjusted.

The spacing adjustment means 19 comprises a support abutting member 35 that abut on a surface 27 on the opposite side to the projection 21 on the support 17*a*, and a screw member 37 that screws into the support abutting member 35.

The support abutting member 35 comprises a pressing portion 35*a* that presses the supports 17*a* and a screwing portion 37 to which the support abutting member 35 is screwed, formed thereon, and the pressing portion 35*a* and the screwed portion 35*b* form an L-shape in cross section. The pressing portion 35*a* is provided at a position corresponding to the projection 21, and presses only the outer circumferential portion of the support 17*a*.

The screw member 37 is a bolt with a head 37*a* engaged with the flange 23 and a shaft 37*b* inserted to the flange 23, thus screwed into the support abutting member 35.

By screwing in the screw member 37, the pressing portion 35*a* of the support abutting member 35 presses the support 17*a* toward the projection 21, and as the projection 21 deforms plastically, the support 17*a* moves toward the other support 17*b* to narrow the drift tube gap d.

Next, an operational effect of the klystron 1 of the embodiment will be explained.

In the cavity resonator 11, to reduce the drift tube gap d, the screw member 37 is tightened. In this manner, the supports 17 is pressed by the pressing portion 35*a* of the support abutting member 35, and thus the projection 21 of the cylindrical body 15 is plastically deformed and crushed. Thus, the drift tube 13*a*, which is fixed to the support 17*a*, approaches the other drift tube 13*b*, thus reducing the drift tube gap d.

When the klystron is operated, the loss of the current induced by the voltage change is converted to heat, which diffuses to the surroundings on the inner walls of the drift tubes 13*a* and 13*b*.

The support 17*a* and the other support 17*b* each have a uniform thickness and do not include thin portions as in the conventional technology. Therefore, the thermal diffusion of the drift tubes 13*a* and 13*b* is not interfered with and the heat is propagated uniformly in the surrounding direction. Thus, the heat is diffused to the support 17*a* and the other support 17*b* and the cylindrical body 15 entirely. As a result, the temperature of the drift tubes 13*a* and 13*b* can be prevented from becoming excessively high, the change in dimensions due to thermal expansion can be reduced, and the change in resonance frequency can be prevented. Thus, the operation of the klystron can be stabilized.

The space adjustment means 19 is constituted by the support abutting member 35 and the screw member 37 that screws into the support abutting member 35, thus achieving a simple configuration. Further, the drift pipe gap can be easily adjusted by screwing the screw member 37.

The support abutting member 35 has substantially an L-shaped cross section formed by the pressing portion 35*a* and the screwed portion 35*b*, which is small and compact shape. Further, the pressing portion 35*a* is located at a position corresponding to the projection 21, and therefore the force to crush the projection 21 (force to plastically deform it) is easily transmitted.

Between the outer circumference 31 of the support 17*a* and the end surface 15*a* of the cylindrical body 15, the airtight space S1 surrounded by the projection 21, the step portion 25 and the abutting piece 29 is formed so as to be communicated to the inner space S0 in the cylindrical body 15. With this structure, even if the supports 17*a* is displaced, the abutting piece 29 can follow it by plastically deforming, and thus the vacuum in the airtight space S1 can be maintained.

The airtight space S1 and the inner space S0 can be easily communicated to each other by the communicating holes 33 formed in the projection 21.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Figure 4:
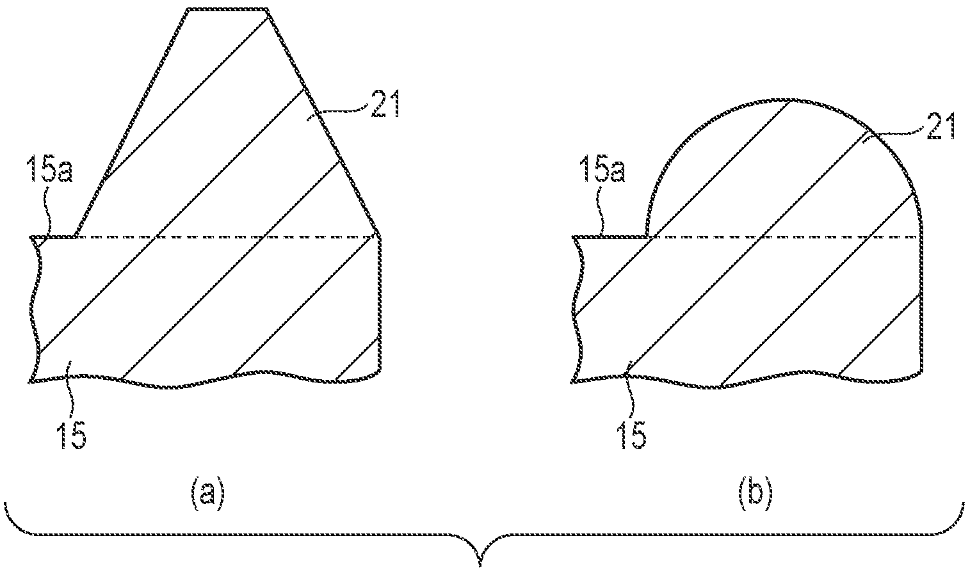
FIG. 4 is a cross-sectional view showing a modified example of the projection.

For example, the shape of the projection 21 is not limited to a rectangular cross-section, but may be a wedge shape in cross-section as shown in FIG. 4, part (a) or a semicircular shape in cross-section as shown in FIG. 4, part (b).

Further, the pressing portion 35*a* on the support abutting member 35 is not limited to the continuous structure along the circumferential direction, but can also be provided with intervals.

What is claimed is:

1. A klystron comprising;

a plurality of cavity resonators arranged next to each other on a coaxial line, the cavity resonators each comprising a cylindrical body, one and another drift tubes provided on respective sides of respective ends of the cylindrical body, one and another support supporting the drift tubes respectively at the respective ends of the cylindrical body, and a space adjustment means which adjusts the space between the one and the other drift tubes, the cylindrical body comprising a projection projecting from one end surface parallel to the axial line, and the one support being provided to abut on the projection, and the space adjustment means pressing the one support toward the projection and adjusts the space between the one and the other drift tubes by plastically deforming the projection.

2. The klystron of claim 1, wherein the spacing adjustment means comprises a support abutting member which abuts on the one support and a screw member that screws into the support abutting member, and the support abutting member presses, as the screw member screws, the one support toward the projection.

3. The klystron of claim 2, wherein the support abutting member comprises a pressing portion protruding toward the one support at a position corresponding to the projection.

4. The klystron of claim 1, wherein the one end surface of the cylindrical body comprises a step portion provided on an outer circumferential portion of the projection, which faces an outer circumferential surface of the one support, and the outer circumferential surface of the one support comprises an abutting piece that abuts on the step portion, and the projection, the step portion, and the abutting piece surround and form an airtight space between the outer circumferential surface of the one support and the one end surface of the cylindrical body.

5. The klystron of claim 4, wherein the projection comprises a communicating hole formed therein, which communicates to an inner space of the cylindrical body.

* * * * *